Oct. 22, 1946.　　　　　E. E. SAWYER　　　　　2,409,645
RESIN-FIBER ARTICLE AND METHOD OF MAKING THE SAME
Filed Oct. 21, 1944　　　　2 Sheets-Sheet 1

Inventor:
Edward E. Sawyer,
by Spear, Rawlings & Spear.
Attorneys

Oct. 22, 1946.  E. E. SAWYER  2,409,645
RESIN-FIBER ARTICLE AND METHOD OF MAKING THE SAME
Filed Oct. 21, 1944  2 Sheets-Sheet 2
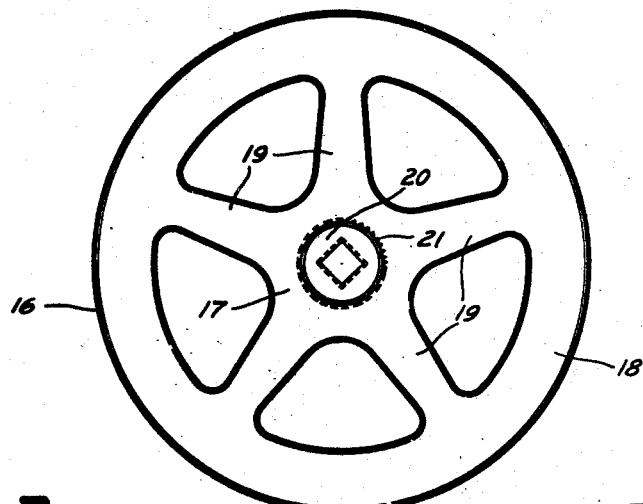
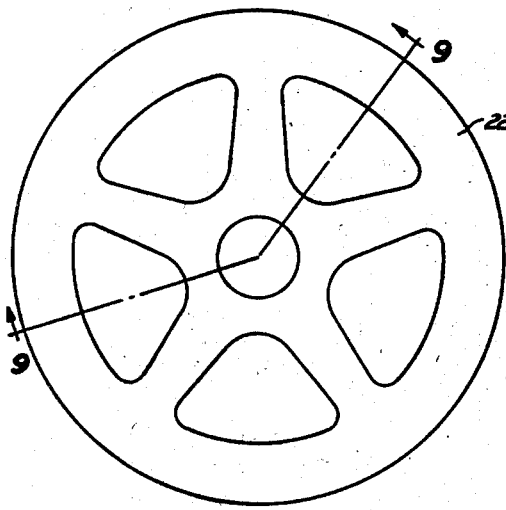
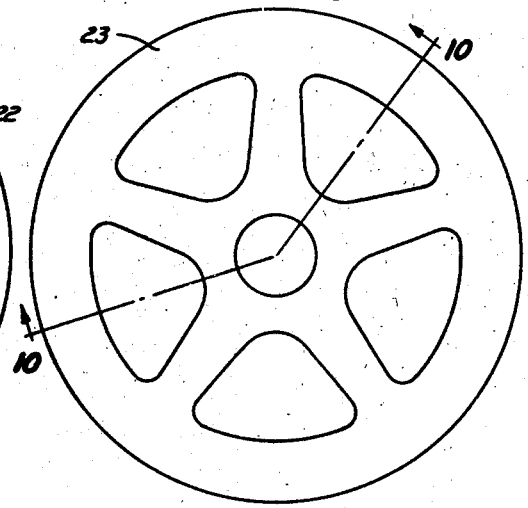
INVENTOR.
EDWARD E. SAWYER
BY
ATTORNEY Patented Oct. 22, 1946

2,409,645

UNITED STATES PATENT OFFICE 2,409,645

RESIN-FIBER ARTICLE AND METHOD OF MAKING THE SAME

Edward E. Sawyer, Waterville, Maine, assignor, by mesne assignments, to The Canal National Bank of Portland, Portland, Maine, a National Banking Association, as trustee Application October 21, 1944, Serial No. 559,789

6 Claims. (Cl. 74—445)

This invention relates to the manufacture of resin-fiber articles, such as panels, table tops, valve wheels, gears, pulleys and the like, composed of suction die molded preformed layers of resin-bearing fibrous materials, and is a continuation-in-part of my co-pending application, Serial No. 481,414, filed April 1, 1943.

The general objects of my invention are to provide durable resin-fiber articles having high mechanical strength and excellent resistance to moisture, water, oil, organic solvents, and other deleterious elements met in service, and which can be economically manufactured.

It is known that a resin-fiber sheet which contains only the minimum amount of resin consistent with satisfactory fiber bonding will form, when finished under heat and pressure, a hard, dense structure with high uniform mechanical strength.

Such a sheet, however, is not only highly absorbent to hydroscopic moisture, water, oil and other liquids, but due to the fact that it does not contain sufficient resin to furnish a strong bond between the contacting surfaces of adjacent layers, it is impossible to satisfactorily bond such sheets to one another to form a multi-layer article of any considerable mechanical strength and thickness.

The amount of resin present, however, is sufficient to bond under heat and pressure the fibers of each sheet into a hard, dense layer of excellent mechanical strength, and accordingly such structures may be satisfactorily used in articles which do not require more than one preformed layer and do not need to be highly resistant to moisture, water, oil or the like.

My present invention, however, aims to utilize these predominantly fiberous preforms for the production of well-bonded multi-layer articles of excellent mechanical strength and high resistance to penetration by moisture, water, oil, and the like.

I have discovered that I can not only satisfactorily bond these predominantly fibrous preforms together to form multilayer articles of excellent mechanical strength, but also to render them highly resistant to penetration by moisture, water, oil, and the like by suction die molding other resin-fiber preforms having a high resin and a low fiber content, assembling these predominantly resinous preforms alternately between the predominantly fibrous preforms, placing the assembly in the mold cavity of a finishing die, and applying heat and pressure to compact the assembly to the required article thickness and to melt the resin in both the predominantly resinous and the predominantly fibrous layers.

In the finishing step, the melted resin of each layer, when hardened, bonds together the fibres composing said layer into an integrated mass. The melted resin of the predominantly resinous layers, when hardened, is not only sufficient to bond together the fibers composing said layers but also to form a bond of great strength between the contacting faces of said layers and the predominantly fibrous layers. In addition, the predominantly resinous layers also provide sufficient resin to flow and extrude at their edges, and the confining action of the finishing die causes this extruded resin to spread and cover the exposed edges of said predominantly fibrous layers. This extruded resin, when hardened, forms a continuous resinous layer which effectively seals said edges against penetration by moisture, water, oil, and the like.

Where it is also desirable to protect the top and bottom surfaces of the finished article, I place additional predominantly resinous preforms over said surfaces in the preform assembly. These additional highly resinous layers render said surfaces highly resistant to moisture, water, oil and the like, as well as giving them a pleasing appearance, and with the protective resinous edge seal forms a continuous protective envelope of hardened resin over the entire exposed surfaces of the article.

To utilize the strength-giving properties of the fibers when bonded with the minimum amout of resin, I prefer to mold my predominantly fibrous preforms relatively thick. This not only conserves the resin which is much more expensive than the fibers, but when only the minimum amount of resin consistent with good fiber-bonding is used, I obtain an article of greater strength than would be obtained if a larger amount of resin were used.

My predominantly resinous preforms, however, are made relatively thin, as these preforms are primarily for bonding, edge-sealing, and surface-protecting purposes and not for mechanical strength. The predominantly resinous preforms, however, do furnish some mechanical strength, due to the fibers which they contain.

Thus my finished articles have high mechanical strength, will not delaminate, all exposed surfaces are effectively sealed against penetration by moisture, water, oil and the like, and are of pleasing appearance.

In the accompanying drawings:

Fig. 6 is a plan view of a finished valve wheel in accordance with my invention.

Fig. 7 is a plan view of one of the predominantly resinous preforms employed in such wheel.

Fig. 8 is a similar view of one of the predominantly fibrous preforms employed in such wheel.

Fig. 9 is a section on the line 9—9 of Fig. 7, and,

Fig. 10 is a section on the line 10—10 of Fig. 8.

In manufacturing my resin-fiber articles, I prefer to proceed as follows:

I prepare aqueous pulp mixtures consisting of cellulosic or other fibrous material to which has been added and intimately mixed a suitable resin. Preferably I use a thermo-setting synthetic resin. The proportion of fibers to resin in these mixtures will vary accordingly as whether a preform which is predominantly resinous or predominantly fibrous is to be made therefrom. At this time I may also add other desired materials to the pulp-resin mixtures, such as fillers, coloring matter, etc.

Figure 1:
Fig. 1 is a vertical fragmentary section of one of my predominantly resinous preforms, prior to compacting and finishing.
Figure 2:
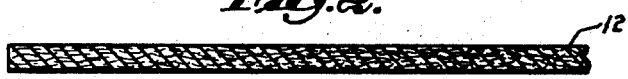
Fig. 2 is a similar view of one of my predominantly fibrous preforms, prior to compacting and finishing.

I next immerse in these mixtures foraminous molding dies corresponding substantially to the surface dimensions and outline of the final article, and suction or pressure mold on such dies predominantly resinous performs 11 and predominantly fibrous performs 12 (see Figs. 1 and 2).

After weld-molding the preforms 11 and 12, I drain them of their surplus water and dry them.

In their dried condition, the preforms 11 and 12 correspond closely in surface dimensions and outline to each other and to the surface dimensions and outline of the final article 10, and may now be assembled for compacting and finishing under heat and pressure.

Figure 4:
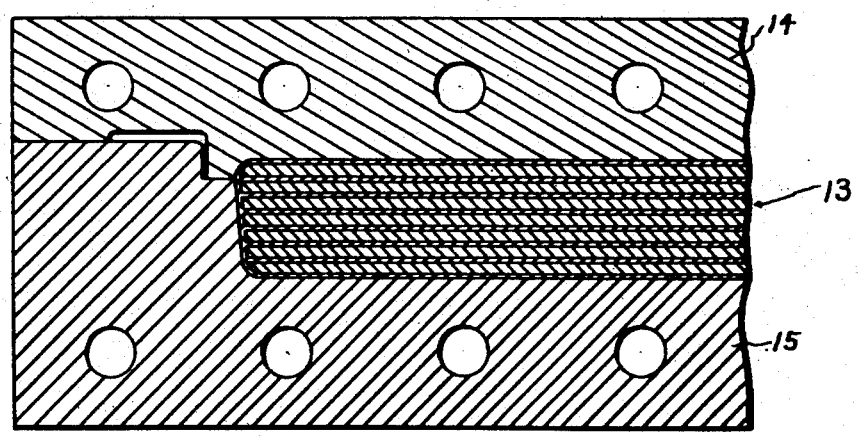
Fig. 4 is a fragmentary section showing the assembly compacted and being finished under heat and pressure in a finishing die.

In the assembling step, the dried preforms are superimposed in the desired order and the assembly 13 is placed between a pair of complemental heated imperforate finishing dies 14 and 15 (see Fig. 4), the mold cavities of which are of the size and shape of the desired finished article.

Figure 3:
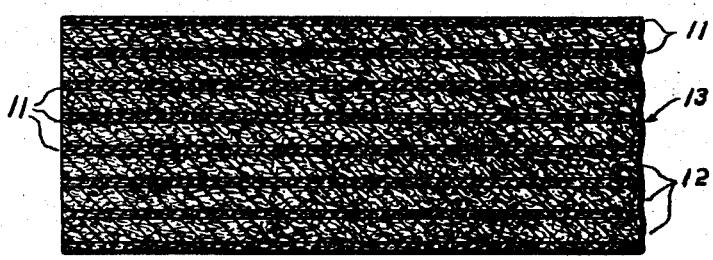
Fig. 3 is a fragmentary vertical section through a preferred assembly of the preforms shown in Figs. 1 and 2, prior to compacting and finishing.

The assembly 13 shown in Fig. 3 is a preferred assembly in which two predominantly resinous preforms, primarily for surface finish and protection, are placed against adjacent predominantly fibrous preforms at the top and bottom ends of the assembly. Other predominantly resinous preforms, primarily for bonding and edge-sealing, are placed in alternating relationship with other predominantly fibrous preforms internally of the assembly.

Obviously, however, the various preforms may be assembled in any desired order to obtain a finished article of desired characteristics. For example, where good bonding and protection against penetration by moisture, water, oil, etc., are required only at the edges of the article, the predominantly resinous top and bottom surface finishing preforms may be omitted.

In the compacting and finishing step, the assembly of properly arranged preforms is placed in the cavity of the female finishing die 15 and the dies are then closed under sufficient heat and pressure to melt the resin and to compact and consolidate the assembly to the required article thickness.

Figure 5:
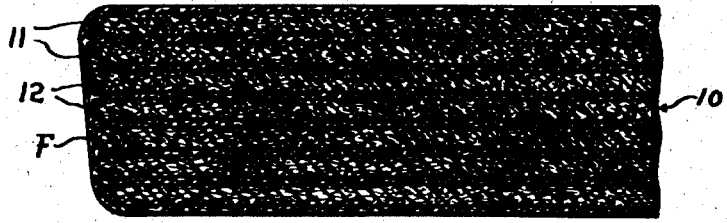
Fig. 5 is a fragmentary section through the finished article on an enlarged scale as compared with Fig. 4, and illustrating the structure of the finished article, the bonding together of the predominantly fibrous layers by the resin of the predominantly resinous layers, and the continuous highly resinous envelope which encases all exposed surfaces of the article.

The effect of the heat and pressure is to cause the resin of the predominantly fibrous layers to melt and flow and when hardened to bond the fibers of these layers, forming a hard dense structure of fibers and hardened resin; to cause the resin of the predominantly resinous layers to melt and flow and when hardened to bond these layers to the predominantly fibrous layers; and to extrude at the exposed edges of the predominantly resinous layers and spread over the entire exposed edge surfaces of the article. Such extruded resin is confined by the dies to form a continuous layer F (see Fig. 5) which, when hardened, protects the edge of the article and, if predominantly resinous preforms are used at the ends of the assembly, to merge with the resin of these preforms, thereby forming a continuous highly resinous envelope which encases all exposed surfaces of the article.

If desired, the surface layers may be colored differently or may be of a different composition than the other layers of the article so that the faces of the article may have different properties. Referring to Figs. 6 to 10 inclusive, wherein I have illustrated the application of my invention to the production of a torque transmitting mechanical element as a valve wheel, such wheel is designated generally at 16, and comprises a hub 17, a rim 18, and a web 19 in the form of a plurality of radial spokes integrally connecting the rim and hub. If desired the hole through the hub may be lined with any suitable metallic or other insert 20 which is bonded therein during the curing step, the exterior surface of the insert preferably being knurled or otherwise roughened as at 21 to facilitate bonding. The alternating predominantly resinous and predominantly fibrous preforms composing said wheel are detailed in Figs. 7 to 10 inclusive, the preform 22 being predominantly resinous and the preform 23 being predominantly fibrous and these preforms corresponding closely in size and shape to each other and to the shape of the final article.

One important advantage of my method is that by molding my preforms to the surface dimensions and outline of the desired final article, I avoid the wastage of material necessary when blanks are cut from sheets of impregnated material by means of stamping dies.

While my preferred method is to use resin-bearing preforms which are predominantly fibrous alternating with resin-bearing preforms which are predominantly resinous, it is to be understood that the term "predominantly" may be a relative term and does not exclude the use of an assembly of preforms in which the resin content of the predominantly resinous preforms is merely greater than the fiber content of said preforms. To accomplish my result it is only necessary that the resin content of the so-called "predominantly resinous" preforms shall be sufficient to accomplish the three-fold purpose of bonding the fibers of the resinous preforms together, of bonding these preforms to the fibrous preforms, and of furnishing sufficient resin for the protective envelope covering the exposed surfaces of the article, and it is with this understanding that the term "predominantly" is used herein.

For example, with certain types of resin, I may produce an article having the foregoing characteristics by using an assembly of preforms in which the resin content of the predominantly fibrous preforms is approximately 20% and the resin content of the predominantly resinous preforms is 50% or more.

It will also be understood that the composition of my preforms and their order of arrangement may be changed as conditions and the particular article require.

These and all such modifications are to be regarded as within the scope of my invention if within the limits of the appended claims.

What I therefore claim and desire to secure by Letters Patent is:

1. A resin-fiber article, comprising a compacted and bonded assembly of superimposed interfelted fibrous layers and resin hardened and integrated under heat and pressure, the ratio of fibers to resin being greater in certain of said layers than in others to produce layers of relatively high resin content and layers of relatively low resin content, the layers of relatively high resin content alternating with the layer of relatively low resin content in the assembly, the resin content of any layer being such as to bond together the fibers composing said layer into an integrated mass, and the resin content of the layers of relatively high resin content also being such as to bond said layers to the layers of relatively low resin content and to furnish at the exposed edges of the article sufficient resin to provide a continuous highly resinous covering encasing the edges of all the layers.

2. A resin-fiber article, comprising a compacted and bonded assembly of superimposed interfelted fibrous layers and resin hardened and integrated under heat and pressure, the ratio of fibers to resin being greater in certain of said layers than in others to produce layers of relatively high resin content and layers of relatively low resin content, the layers of relatively high resin content alternating with the layers of relatively low resin content in the assembly, the resin content of any layer being such as to bond together the fibers composing said layer into an integrated mass, and the resin content of the layers of relatively high resin content also being such as to bond said layers to the layers of relatively low resin content and to furnish at the exposed edges of the article sufficient resin to provide a continuous highly resinous covering encasing the edges of all the layers, two of said layers of relatively high resin content being arranged at the respective ends of the assembly and furnishing highly resinous coverings at the faces of the article which are continuous with said first-named resinous covering and furnish therewith a protective envelope for the entire surface of the article.

3. A torque transmitting mechanical element comprising a hub, a rim, and integral means connecting said hub and rim, said element being a compacted and bonded assembly of superimposed interfelted fibrous layers and resin hardened and integrated under heat and pressure, the ratio of fibers to resin being greater in certain of said layers than in others to produce layers of relatively high resin content and layers of relatively low resin content, the layers of relatively high resin content alternating with the layers of relatively low resin content in the assembly, the resin content of any layer being such as to bond together the fibers composing said layer into an integrated mass, and the resin content of the layers of relatively high resin content also being such as to bond said layers to the layers of relatively low resin content and to furnish at the exposed edges of the element sufficient resin to provide a continuous highly resinous covering encasing the edges of all the layers.

4. A torque transmitting mechanical element comprising a hub, a rim, and integral means connecting said hub and rim, said element being a compacted and bonded assembly of superimposed interfelted fibrous layers and resin hardened and integrated under heat and pressure, the ratio of fibers to resin being greater in certain of said layers than in others to produce layers of relatively high resin content and layers of relatively low resin content, the layers of relatively high resin content alternating with the layers of relatively low resin content in the assembly, the resin content of any layer being such as to bond together the fibers composing said layer into an integrated mass, and the resin content of the layers of relatively high resin content also being such as to bond said layers of relatively low resin content and to furnish at the exposed edges of the element sufficient resin to provide a continuous highly resinous covering encasing the edges of all the layers, two of said layers of relatively high resin content being arranged at the respective ends of the assembly and furnishing highly resinous coverings at the faces of the article which are continuous with said first-named resinous covering and furnish therewith a protective envelope for the entire surface of the article.

5. In the method of manufacturing a resin-bearing fibrous article, the steps which comprise suction-die molding a plurality of loosely felted fibrous preforms of substantially the planar shape of the finished article and of different resin-fiber composition from aqueous mixtures of fibers and synthetic resin, the ratio of fibers to resin in certain of said mixtures being such as to produce predominantly fibrous preforms and in certain other of said mixtures being such as to produce predominantly resinous preforms, removing the wet preforms from the dies on which they were molded and drying them, assembling a plurality of the dried preforms in superimposed order between a pair of heated finishing dies with the predominantly resinous preforms alternating with the fibrous preforms in the assembly, closing said heated finishing dies on the assembly with sufficient pressure to compact the assembly to final article dimension while applying heat to melt the resin and bond together the fibers and the contacting faces of the several preforms and cause the melted resin to extrude at the edges of the predominantly resinous preforms, and confining said extruded resin during the application of pressure and heat to cause it to spread and encase the exposed edges of all the performs within a highly resinous protective covering.

6. In the method of manufacturing a resin-bearing fibrous article, the steps which comprise suction-die molding a plurality of loosely felted fibrous preforms of substantially the planar shape of the finished article and of different resin-fiber composition from aqueous mixtures of fibers and synthetic resin, the ratio of fibers to resin in certain of said mixtures being such as to produce predominantly fibrous preforms and in certain other of said mixtures being such as to produce predominantly resinous preforms, removing the wet preforms from the dies on which they were molded and drying them, assembling a plurality of the dried preforms in superimposed order between a pair of heated finishing dies with the the predominantly resinous preforms alternating with the predominantly fibrous preforms in the assembly, and with two of said predominantly resinous preforms arranged at the respective ends of the assembly, closing said heated finishing dies on the assembly, with sufficient pressure to compact the assembly to final article dimension while applying heat to melt the resin and bond together the fibers and the contacting faces of the several preforms and cause the melted resin to extrude at the edges of the predominantly resinous preforms, and confining said extruded resin during the application of pressure and heat to cause it to spread and encase the exposed edges of all the preforms and the top and bottom surfaces of the article within a continuous highly resinous protective covering.

EDWARD E. SAWYER.